United States Patent [19]

Newton

[11] 4,319,825
[45] Mar. 16, 1982

[54] CAMERA AND FLASH UNIT SUPPORT

[76] Inventor: Robert B. Newton, 5885 Bartram Cir., N. Jacksonville, Fla. 32207

[21] Appl. No.: 126,549

[22] Filed: Mar. 3, 1980

[51] Int. Cl.³ .............................................. G03B 17/00
[52] U.S. Cl. ...................................... 354/293; 354/82
[58] Field of Search ............................ 354/293, 81, 82

[56] References Cited

U.S. PATENT DOCUMENTS

| | | | |
|---|---|---|---|
| 3,575,098 | 4/1971 | Jones | 354/293 |
| 4,081,814 | 3/1978 | Bulland | 354/293 |
| 4,091,402 | 5/1978 | Siegel | 354/293 |
| 4,198,150 | 4/1980 | Sloop | 354/293 |

Primary Examiner—Russell E. Adams
Attorney, Agent, or Firm—Arthur G. Yeager

[57] ABSTRACT

A support for a camera and a flash unit which permits the camera to be rotated 90° while maintaining a flash unit in a fixed position.

28 Claims, 9 Drawing Figures

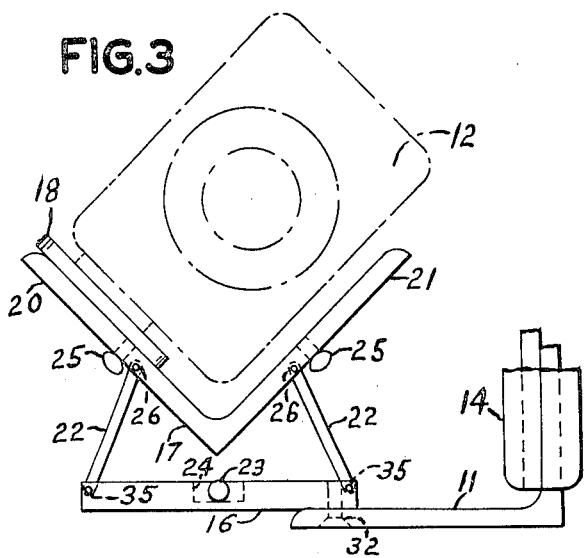
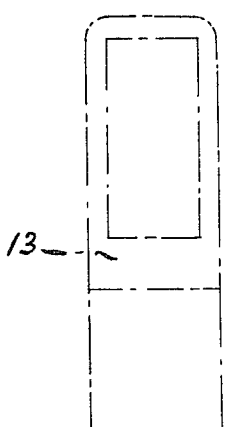
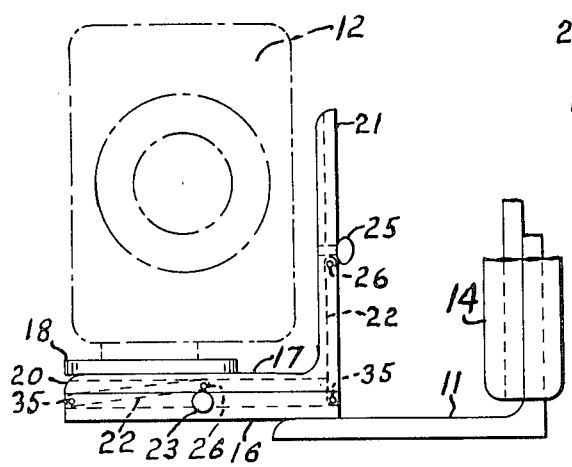
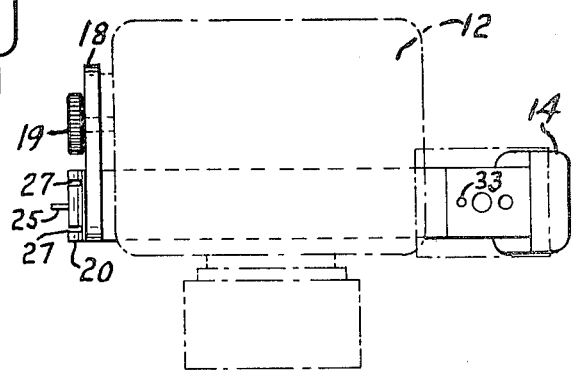
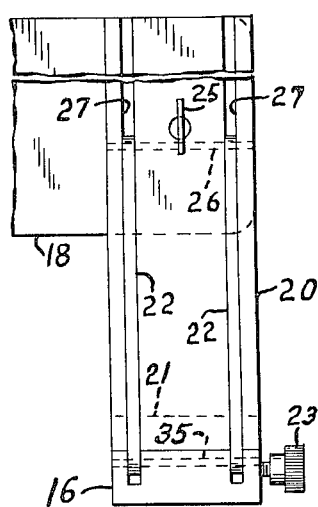
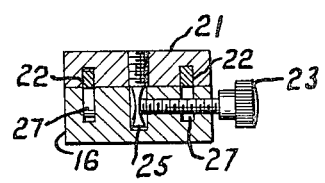

CAMERA AND FLASH UNIT SUPPORT

BACKGROUND OF THE INVENTION

Photographers frequently have occasion to rotate the camera from a vertical position to a horizontal position in order to obtain better coverage of the subject matter in a single photograph. Many cameras take photographs which are not square but rather are rectangular with the height of the photograph being smaller than the width of the photograph. With such cameras it is advantageous to hold the camera in its normal horizontal position for taking pictures of most subjects but when the subject needs a vertical format a photographer finds it to be advantageous to rotate the camera to a vertical position so as to use the longer dimensions of the photograph to bring more of the subject matter into the picture being taken. While photographers have no physical problem, rotating the camera from horizontal to vertical with or without flash, other problems arise when the flash is moved to a different position. With the flash on the camera or attached on a standard bracket the angle of the flash changes when the camera is rotated causing harsh shadows. Without this invention the only alternative is to hold the flash steady in one hand while trying to operate the camera with the other hand. This is very difficult even for experienced photographers. The support of this invention eliminates the necessity of trying to handle two pieces of equipment with only two hands and to twist through the contortions of rotating the camera accurately through a right angle when the photographed subject demands it.

It is an object of this invention to provide support for a camera and its flash unit which holds the flash unit in a fixed position while the camera is rotated to either or two positions 90° apart.

It is another object of this invention to provide a light weight camera support which is adaptable to any of various types of cameras and flash units and which permits rotation of the camera without movement of the flash unit. Still other objects of this invention will become apparent from the more detailed description which follows.

BRIEF SUMMARY OF THE INVENTION

This invention provides a support for a camera and flash unit comprising a handle, a first structure rigidly affixed to said handle and adapted to support a flash unit, a second structure adapted to support a camera and to provide said camera with relative movement with respect to said handle whereby the camera is capable of rotation between positions 90° apart while maintaining the same direction to which the camera is pointed. In one specific embodiment of this invention the second structure is a right angle bracket pivotally attached to said handle in such a fashion that the legs of the bracket can be rotated to either of two fixed positions 90° apart.

In another specific embodiment of this invention the right angle bracket to which the camera is supported is attached to a horizontal base by pivot arms pivotally connected to the horizontal base at one end thereof and pivotally connected to the midpoint of one leg of the bracket at the other end thereof.

In other embodiments of this invention there are means for locking the right angle bracket in either of the two fixed positions, and means for extending the flash support vertically or horizontally to any of several positions.

BRIEF DESCRIPTION OF THE DRAWINGS

The novel features believed to be characteristic of this invention are set forth with particularity in the appended claims. The invention, itself, however, both as to its organization and method of operation, together with further objects and advantages thereof, may best be understood by reference to the following description taken in connection with the accompanying drawings in which:

FIG. 1 is a front elevational view of the support of this invention with a camera and flash unit attached thereto.

FIG. 2 is a top plan view of the support and attachment of FIG. 1.

FIG. 3 is a partial front elevational view showing the camera support being moved to rotate the camera through 90°.

FIG. 4 is a partial front elevational view showing the camera after having been rotated through 90° as compared to the view in FIG. 1.

FIG. 5 is a partial side view taken at 5—5 of FIG. 1.

FIG. 6 is cross sectional view taken at 6—6 of FIG. 1.

DETAILED DESCRIPTION OF THE INVENTION

Figure 7:
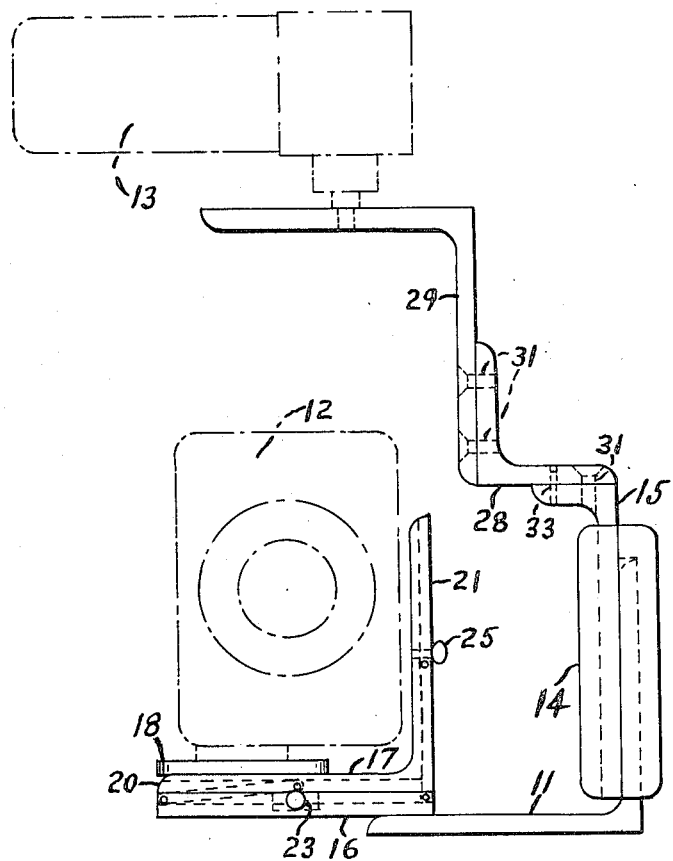
FIG. 7 is a front elevational view similar to that of FIG. 4 except that the structure for supporting the flash unit is extended both vertically and horizontally to a different location with respect to the camera and providing a different orientation of the flash unit.

In FIGS. 1-4 the features of this invention can be readily understood. Camera 12 and flash unit 13 are attached to support 11. Support 11 is comprised principally of vertical handle 14 with flash support 15 vertically above the top of handle 14, and with the camera supported on horizontal base 16 extending horizontally from the bottom of handle 14. Attached to horizontal base 16 is right angle bracket 17 to which camera 12 is attached by means of camera support plate 18 and thumbscrew 19, which is of the standard size to fit a threaded hole that is a standard feature of all cameras for attachment to a tripod. Bracket 17 comprises two legs 20 and 21 joined to produce a right angle section and camera 12 is attached to support plate 18 which, in turn may be fixed to either of these legs, the illustration of FIG. 1 showing the attachment to leg 20.

Bracket 17 is movable so as to rotate the camera through 90° without changing the direction to which the camera lens is pointed. In FIG. 1 the camera is in one position and in FIG. 4 the camera has been rotated through 90° while the camera remains pointed in the same direction. In FIG. 3 there is an illustration of the components of this invention with the camera about midway in its rotation between the positions shown in FIGS. 1 and 4. In the embodiment illustrated in these drawings there are two pairs of pivot arms 22 attached pivotally to the approximate midpoint of each of legs 20 and 21. The other ends of the pivot arms 22 are attached pivotally to the respective ends of horizontal base 16. It may be readily appreciated that with such a system of levers and pivots bracket 17 may be rotated from one position in which leg 21 is lying on base 16 (FIG. 1) to the other position where leg 20 is lying on base 16 (FIG. 4). This arrangement provides a solid stationary support for the camera in either of the two positions, eliminating any possibility of vibration or any other slight movement which might destroy the clarity and sharpness of the photographs. In base 16 there is provided a slot 24 to receive either of projections 24, which in turn, cooperates with setscrew 23 to provide the capability for locking bracket 17 in either of the two terminal positions to provide added security against unwanted movement of the camera.

In FIG. 2 there may be seen the end view of leg 20 showing a pair of parallel grooves 27 designed to receive the respective pair of pivot arms 22 when bracket 17 is in either of the two terminal positions shown in FIG. 1 or FIG. 4. In FIGS. 1 and 4 there may be seen (in dotted lines) pivot arms 22 folded into grooves 27 in the extreme positions of bracket 17.

In FIG. 5 there is a more detailed view of the outer surface of leg 20, which is identical to the outer surface of leg 21. Pivot arms 22 are folded into a portion of grooves 27 with pivot pin 26 attaching one end of pivot arms 22 to leg 20 and pivot pin 35 attaching the other end of pivot arms 22 to horizontal base 16.

In FIG. 6 there is shown in cross section the components which provide a means for locking bracket 17 into one or the other of the two extreme positions. In those extreme positions projection 25, which may be the head of a thumbscrew, fits into slot 24 in horizontal base 16. Cooperating with projection 25 and slot 24 is the setscrew 23 which can be advanced sufficiently to bear against the head of projection 25 and to prevent leg 21 from being raised or otherwise moved from its position as shown in this drawing. Pivot arms 22 are shown folded into grooves 27 in their appropriate locations.

Figure 8:
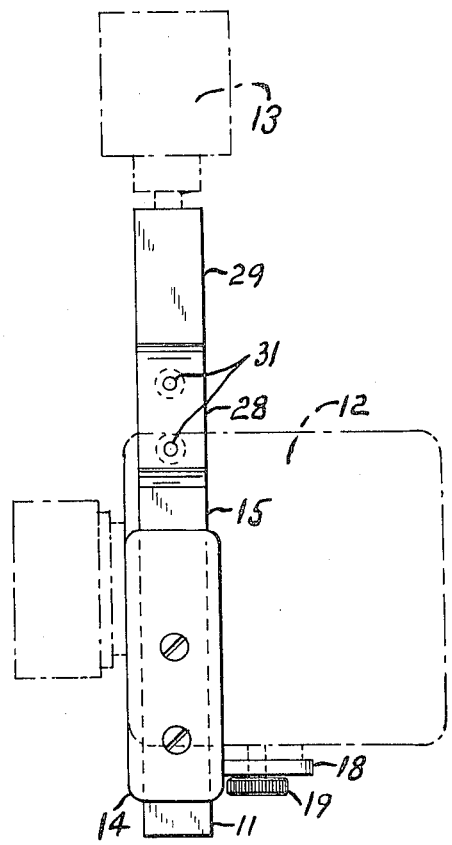
FIG. 8 is a side elevational view of the arrangement shown in FIG. 7.
Figure 9:
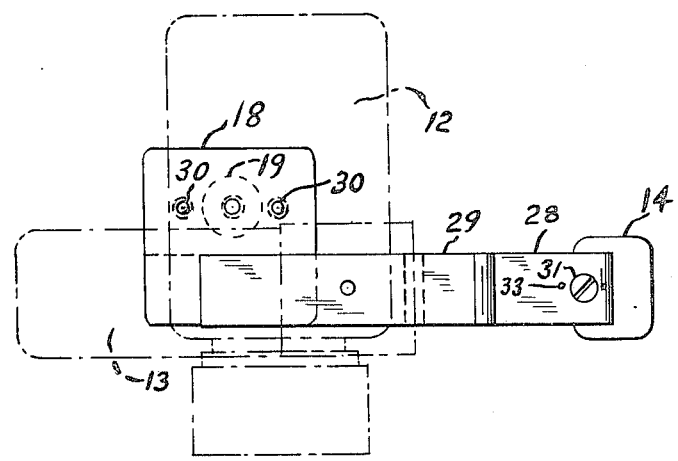
FIG. 9 is a top plan view of the arrangement shown in FIG. 7.

In FIGS. 7-9 there is shown an alternative embodiment of this invention wherein the camera support features are identical to those just described with respect to FIGS. 1-6, but wherein the flash unit support is different. In this instance there has been added to support 15 two cooperating angle pieces 28 and 29 to provide a support for flash unit 13 which is at a different location than that of FIG. 1. In this instance flash unit 13 is shown as the same as that employed in FIG. 1 but attached horizontally rather than vertically. There are of course many types of flash units available to photographers for attachment to any of a wide variety of cameras and accordingly there may be reasons to employ different locations, different elevations, and different types of supports for flash units in connection with the device of this invention. It is intended within the scope of this invention to encompass different sizes of angle pieces 28 and 29 to permit attachments to support 15 to provide a horizontal supporting surface at different elevations and different horizontal locations with respect to camera 12 as chosen by the photographer. It can be seen that the attachment of angle pieces 28 and 29 to each other and to support 15 is readily accomplished by means of flathead machine screws 31. If two such machine screws are employed as shown with respect to the attachment between angle pieces 28 and 29, a rigid immovable attachment is made. On the other hand, there is an equally immovable attachment made by employing a single machine screw in cooperation with a single dowel pin 33 to provide an equally rigid immovable attachment.

The only other feature shown in these drawings in FIGS. 7-9 that is not shown in the drawings described above is the alternate locations for thumbscrew 19 which attaches camera 12 to camera support plate 18. Support plate 18 is made with two or more alternate threaded holes which will permit any of a variety of cameras to be attached to this one small support plate 18 and fit within the limitations of the camera support as set by the dimensions of angle bracket 17.

Although the embodiment shown in the attached drawings is a preferred means of providing movement of angle bracket 17 to rotate the camera 90°, there are several other modes of attachment for accomplishing the same purpose and it is not intended that this invention shall be limited to any single embodiment. It is only necessary that a means be provided to rotate the camera through 90° to a fixed position at both ends of that rotation. A hinge at the apex of bracket 17 in combination with any appropriate type of snap-fit fastener can be employed equally well. Other means of providing this 90° rotation that would be equally operative are known to those skilled in machine design and manufacture.

There is also shown in these attached drawings the combination of horizontal base 16 attached to the horizontal arm 36 extending from the bottom of handle 14. It is, of course, not necessary that there be two separate pieces joined to each other by means of machine screw 32 and dowel pin 34 (as shown as in FIG. 3) since these two pieces could be replaced by a single integral unit. The embodiment shown in these drawings provides the flexibility of having a single basic component consisting of handle 14 support 15, and horizontal arm 36, to which can be attached the remaining camera support units in any of a variety of sizes to fit different cameras and flash units. This type of structure permits the photographer to assemble various attachments to the basic component to join any camera to any flash unit in whatever respective locations are desirable.

Similarly, handle 14 need not be positioned vertically as shown in these drawings, but may be in any position convenient for the photographer. The only requirement, other than its capability of functioning as a handle for one hand, is that it be connected also to the flash unit support and to the camera rotation structure.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A support for a camera comprising a horizontal base plate having opposite end portions, a camera attachment member above and movably connected to said horizontal base plate, elongated link means having spaced end portions, means for pivotally connecting said link means end portions to each of said camera attachment member and said horizontal base adjacent at least one of said base plate end portions, said camera attachment member being rotatable from a position parallel to said base plate to a position substantially vertical thereto, and means to releasably lock said camera attachment member to said base plate in each of said positions.

2. The support of claim 1 wherein said camera attachment member includes a right angle bracket having a pair of legs, said link means being pivotally connected to at least one of said legs generally medially thereof.

3. The support of claim 1 wherein said camera attachment member includes a right angle bracket having a pair of legs, said link means including a pair of pivot arms pivotally attached adjacent respective said base end portions and pivotally connected to respective said legs generally medially thereof.

4. The support of claim 1 wherein said camera attachment member includes a right angle bracket having a pair of legs, said link means including two pairs of pivot arms, one of said pairs of pivot arms being pivotally attached adjacent one of said base end portions and pivotally connected to one of said legs generally medially thereof, the other of said pairs of pivot arms being pivotally attached adjacent the other of said base end portions and pivotally connected to the other of said legs generally medially thereof.

5. The support of claim 4 wherein said lock means includes a releasable locking element generally medially of said base member, each of said legs including a locked element generally medially thereof, said locked element on said one leg cooperating with said releasable locking element when said one leg is parallel with said base member and said locked element on said other leg cooperating with said releasable locking element when said other leg is parallel with said base member.

6. The support of claim 1 wherein said horizontal base plate and said attachment member include elongated facing and parallel channels, said link means being disposed in said channels.

7. The support of claim 3 wherein said horizontal base plate and each of said legs include elongated channels which face said base plate channel when each of said legs is pivoted parallel to said base plate, said pivot arms having one end disposed in said base plate channel and the other end disposed in respective said leg channel.

8. The support of claim 7 wherein said lock means includes a releasable locking element generally medially of said base member, each of said legs including a locked element generally medially thereof, said locked elements respectively cooperating with said locking element when respective said legs are disposed parallel to said base member.

9. The support of claim 1, further comprising a handle having an end portion thereof mounted to one of said base end portions.

10. The support of claim 9 wherein said handle extends from said end portion laterally and thence upwardly terminating in an upper end portion.

11. The support of claim 10 further comprising means for attaching a flash unit to said upper end portion.

12. The support of claim 10 further comprising means attached to said upper end portion extending laterally of said handle in the direction of said base plate to provide a horizontal surface generally parallel to said base plate and above said camera attachment member, means for attaching a flash unit to said horizontal surface.

13. The support of claim 3 wherein said lock means includes a releasable locking element generally medially of said base member, each of said legs including a locked element generally medially thereof, said locked elements respectively cooperating with said locking element when respective said legs are disposed parallel to said base member.

14. The support of claim 13 wherein said locked elements depend downwardly from respective said legs, said base member including a slot into which each of said locked elements enters when respective said legs are disposed parallel to said base member, said releasable locking element extending into said slot to engage and retain respective said locked elements.

15. A support for a camera comprising a horizontal base plate having opposite end portions, a camera attachment member above and movably connected to said horizontal base plate, and elongated link means having spaced end portions, means for pivotally connecting said link means end portions to each of said camera attachment member and said horizontal base adjacent at least one of said base plate end portions, said camera attachment member being rotatable from a position parallel to said base plate to a position substantially vertical thereto.

16. The support of claim 15 wherein said camera attachment member includes a right angle bracket having a pair of legs, said link means being pivotally connected to at least one of said legs generally medially thereof.

17. The support of claim 15 wherein said camera attachment member includes a right angle bracket having a pair of legs, said link means including a pair of pivot arms pivotally attached adjacent respective said base end portions and pivotally connected to respective said legs generally medially thereof.

18. The support of claim 15 wherein said camera attachment member includes a right angle bracket having a pair of legs, said link means including two pairs of pivot arms, one of said pairs of pivot arms being pivotally attached adjacent one of said base end portions and pivotally connected to one of said legs generally medially thereof, the other of said pairs of pivot arms being pivotally attached adjacent the other of said base end portions and pivotally connected to the other of said legs generally medially thereof.

19. The support of claim 18 further comprising lock means to releasably lock said camera attachment member to said base plate in each of said positions, said lock means including a releasable locking element generally medially of said base member, each of said legs including a locked element generally medially thereof, said locked element on said one leg cooperating with said releasable locking element when said one leg is parallel with said base member and said locked element on said other leg cooperating with said releasable locking element when said other leg is parallel with said base member.

20. The support of claim 15 wherein said horizontal base plate and said attachment member include elongated facing and parallel channels, said link means being disposed in said channels.

21. The support of claim 17 wherein said horizontal base plate and each of said legs include elongated channels which face said base plate channel when each of said legs is pivoted parallel to said base plate, said pivot arms having one end disposed in said base plate channel and the other end disposed in respective said leg channel.

22. The support of claim 21 further comprising lock means to releasably lock said camera attachment member to said base plate in each of said positions, said lock means including a releasable locking element generally medially of said base member, each of said legs including a locked element generally medially thereof, said locked elements respectively cooperating with said locking element when respective said legs are disposed parallel to said base member.

23. The support of claim 15, further comprising a handle having an end portion thereof mounted to one of said base end portions.

24. The support of claim 23 wherein said handle extends from said end portion laterally and thence upwardly terminating in an upper end portion.

25. The support of claim 24 further comprising means for attaching a flash unit to said upper end portion.

26. The support of claim 24 further comprising means attached to said upper end portion extending laterally of said handle in the direction of said base plate to provide a horizontal surface generally parallel to said base plate and above said camera attachment member, means for attaching a flash unit to said horizontal surface.

27. The support of claim 17 further comprising lock means to releasably lock said camera attachment member to said base plate in each of said positions, said lock means including a releasable locking element generally medially of said base member, each of said legs including a locked element generally medially thereof, said locked elements respectively cooperating with said locking element when respective said legs are disposed parallel to said base member.

28. The support of claim 27 wherein said locked elements depend downwardly from respective said legs, said base member including a slot into which each of said locked elements enters when respective said legs are disposed parallel to said base member, said releasable locking element extending into said slot to engage and retain respective said locked elements.

* * * * *